(12) United States Patent
Malkin et al.

(10) Patent No.: US 8,792,597 B2
(45) Date of Patent: Jul. 29, 2014

(54) REDUCING ELECTROMAGNETIC INTERFERENCE IN A RECEIVE SIGNAL WITH AN ANALOG CORRECTION SIGNAL

(75) Inventors: Moshe Malkin, Mountain View, CA (US); Jose Tellado, Mountain View, CA (US)

(73) Assignee: Aquantia Corporation, Milpitas, CA (US)

( * ) Notice: Subject to any disclaimer, the term of this patent is extended or adjusted under 35 U.S.C. 154(b) by 641 days.

(21) Appl. No.: 12/818,549

(22) Filed: Jun. 18, 2010

(65) Prior Publication Data

US 2011/0310936 A1    Dec. 22, 2011

(51) Int. Cl.
    *H04L 1/00*    (2006.01)
(52) U.S. Cl.
    USPC .......... 375/346; 375/148; 370/285; 455/63.1; 455/226.1
(58) Field of Classification Search
    USPC .......... 375/148, 219, 285, 340, 346; 370/287; 455/501, 63.1, 67.11, 67.13, 226.1
    See application file for complete search history.

(56) References Cited

U.S. PATENT DOCUMENTS

| | | |
|---|---|---|
| 3,506,906 A | 4/1970 | Nestor |
| 3,671,859 A | 6/1972 | Miller |
| 4,797,902 A | 1/1989 | Nishiguchi et al. |
| 4,870,370 A | 9/1989 | Hedberg et al. |
| 5,157,690 A | 10/1992 | Buttle |
| 5,283,811 A | 2/1994 | Chennakeshu et al. |
| 5,550,924 A | 8/1996 | Helf et al. |
| 5,777,692 A | 7/1998 | Ghosh |
| 5,832,032 A | 11/1998 | Overbury |
| 5,889,511 A | 3/1999 | Ong et al. |
| 5,910,960 A | 6/1999 | Claydon et al. |
| 5,995,566 A | 11/1999 | Rickard et al. |
| 5,995,567 A | 11/1999 | Cioffi et al. |
| 6,011,508 A | 1/2000 | Perreault et al. |
| 6,035,360 A | 3/2000 | Doidge et al. |
| 6,052,420 A | 4/2000 | Yeap et al. |
| 6,069,917 A | 5/2000 | Werner et al. |
| 6,285,718 B1 | 9/2001 | Reuven |
| 6,385,315 B1 | 5/2002 | Viadella et al. |
| 6,424,234 B1 | 7/2002 | Stevenson |
| 6,486,746 B1 | 11/2002 | Gilbert |
| 6,683,913 B1 | 1/2004 | Kantschuk |

(Continued)

FOREIGN PATENT DOCUMENTS

| | | |
|---|---|---|
| WO | WO 97/40587 | 10/1997 |
| WO | WO2011/056970 A2 | 5/2011 |

OTHER PUBLICATIONS

U.S. Appl. No. 12/563,938, filed Sep. 21, 2009, Sedarat.
U.S. Appl. No. 12/604,323, filed Oct. 22, 2009, Sedarat et al.

(Continued)

*Primary Examiner* — Dac Ha
(74) *Attorney, Agent, or Firm* — Lance Kreisman; Peninsula Patent Group

(57) ABSTRACT

Embodiments of methods and apparatuses for reducing electromagnetic interference in a receive signal are disclosed. One method includes receiving a receive signal. An analog cancellation signal is generated. The analog cancellation signal is summed with a receive signal, thereby mitigating electromagnetic interference in the receive signal. One apparatus includes a transceiver that includes a receive analog to digital converter (ADC) sampling a receive signal. Electromagnetic interference (EMI) processing circuitry generates an analog cancellation signal. The analog cancellation signal is summed with a receive signal, thereby mitigating electromagnetic interference in the receive signal.

42 Claims, 13 Drawing Sheets

(56) References Cited

U.S. PATENT DOCUMENTS

| | | |
|---|---|---|
| 6,690,739 B1 | 2/2004 | Mui |
| 6,711,207 B1 | 3/2004 | Amrany et al. |
| 6,734,659 B1 | 5/2004 | Fortner |
| 6,924,724 B2 | 8/2005 | Grilo et al. |
| 6,934,345 B2 | 8/2005 | Chu et al. |
| 6,959,056 B2 | 10/2005 | Yeap et al. |
| 6,999,504 B1 | 2/2006 | Amrany et al. |
| 7,026,730 B1 | 4/2006 | Marshall et al. |
| 7,031,402 B2 * | 4/2006 | Takada .......................... 375/296 |
| 7,103,013 B1 | 9/2006 | Kim et al. |
| 7,123,117 B2 | 10/2006 | Chen et al. |
| 7,164,764 B2 | 1/2007 | Zimmerman et al. |
| 7,173,992 B2 | 2/2007 | Frigon |
| 7,200,180 B2 | 4/2007 | Verbin et al. |
| 7,315,592 B2 | 1/2008 | Tsatsanis et al. |
| 7,333,603 B1 | 2/2008 | Sallaway et al. |
| RE40,149 E | 3/2008 | Vitenberg |
| 7,440,892 B2 | 10/2008 | Tamura |
| 7,457,386 B1 | 11/2008 | Phanse |
| 7,459,982 B2 | 12/2008 | Miao |
| 7,492,840 B2 | 2/2009 | Chan |
| 7,522,928 B2 | 4/2009 | O'Mahony |
| 7,542,528 B1 | 6/2009 | Cheong |
| 7,634,032 B2 | 12/2009 | Chu et al. |
| 7,656,956 B2 | 2/2010 | King |
| 7,706,434 B1 | 4/2010 | Farjadrad |
| 7,708,595 B2 | 5/2010 | Chow et al. |
| 8,094,546 B2 | 1/2012 | Schenk |
| 8,139,602 B2 | 3/2012 | Meier |
| 8,284,007 B1 | 10/2012 | Langner et al. |
| 8,320,411 B1 | 11/2012 | Sedarat et al. |
| 8,331,508 B2 * | 12/2012 | Dabiri .......................... 375/346 |
| 8,472,532 B2 | 6/2013 | Schley-May et al. |
| 8,625,704 B1 | 1/2014 | Sedarat et al. |
| 2003/0186591 A1 | 10/2003 | Jensen et al. |
| 2003/0223488 A1 | 12/2003 | Li et al. |
| 2003/0223505 A1 | 12/2003 | Verbin et al. |
| 2004/0023631 A1 | 2/2004 | Deutsch et al. |
| 2004/0164619 A1 | 8/2004 | Parker et al. |
| 2004/0213366 A1 | 10/2004 | Ono |
| 2004/0239465 A1 | 12/2004 | Chen et al. |
| 2004/0252755 A1 | 12/2004 | Jaffe et al. |
| 2004/0257743 A1 | 12/2004 | Chen et al. |
| 2005/0018777 A1 | 1/2005 | Azadet |
| 2005/0025266 A1 | 2/2005 | Chan |
| 2005/0053229 A1 | 3/2005 | Tsatsanis et al. |
| 2005/0097218 A1 | 5/2005 | Sultenfuss et al. |
| 2005/0123081 A1 | 6/2005 | Shirani |
| 2005/0135489 A1 | 6/2005 | Ho et al. |
| 2005/0203744 A1 | 9/2005 | Tamura |
| 2005/0243483 A1 | 11/2005 | Chen et al. |
| 2006/0018388 A1 | 1/2006 | Chan |
| 2006/0056503 A1 | 3/2006 | Keshab et al. |
| 2006/0159186 A1 | 7/2006 | King |
| 2006/0182014 A1 | 8/2006 | Lusky et al. |
| 2006/0256880 A1 | 11/2006 | Frisch |
| 2007/0014378 A1 | 1/2007 | Parhi et al. |
| 2007/0081475 A1 | 4/2007 | Telado et al. |
| 2007/0146011 A1 | 6/2007 | O'Mahony et al. |
| 2007/0192505 A1 | 8/2007 | Dalmia |
| 2007/0258517 A1 | 11/2007 | Rollings et al. |
| 2007/0280388 A1 | 12/2007 | Torre et al. |
| 2008/0089433 A1 | 4/2008 | Cho et al. |
| 2008/0095283 A1 | 4/2008 | Shoor et al. |
| 2008/0107167 A1 | 5/2008 | Tung et al. |
| 2008/0160915 A1 | 7/2008 | Sommer et al. |
| 2008/0198909 A1 | 8/2008 | Tsatsanis et al. |
| 2008/0267212 A1 | 10/2008 | Crawley et al. |
| 2009/0061808 A1 * | 3/2009 | Higgins ....................... 455/306 |
| 2009/0097401 A1 | 4/2009 | Diab |
| 2009/0097539 A1 | 4/2009 | Furman |
| 2009/0154455 A1 | 6/2009 | Diab |
| 2009/0161781 A1 | 6/2009 | Kolze |
| 2010/0046543 A1 | 2/2010 | Parnaby |
| 2010/0073072 A1 | 3/2010 | Ullen et al. |
| 2010/0074310 A1 | 3/2010 | Roo et al. |
| 2010/0086019 A1 | 4/2010 | Agazzi et al. |
| 2010/0111202 A1 | 5/2010 | Schley-May et al. |
| 2010/0159866 A1 | 6/2010 | Fudge et al. |
| 2011/0032048 A1 | 2/2011 | Wu et al. |
| 2011/0069794 A1 * | 3/2011 | Tavassoli Kilani et al. .. 375/346 |
| 2011/0106459 A1 * | 5/2011 | Christ et al. ................... 702/42 |
| 2011/0212692 A1 * | 9/2011 | Hahn et al. ................... 455/63.1 |
| 2011/0256857 A1 * | 10/2011 | Chen et al. ................. 455/422.1 |
| 2011/0293041 A1 | 12/2011 | Luo et al. |
| 2011/0296267 A1 * | 12/2011 | Malkin et al. ................. 714/746 |

OTHER PUBLICATIONS

U.S. Appl. No. 12/604,343, filed Oct. 22, 2009, Farjadrad et al.
U.S. Appl. No. 12/604,351, filed Oct. 22, 2009, Sedarat et al.
U.S. Appl. No. 12/604,358, filed Oct. 22, 2009, Sedarat et al.
U.S. Appl. No. 12/977,844, filed Dec. 23, 2010, Sedarat.

* cited by examiner

REDUCING ELECTROMAGNETIC INTERFERENCE IN A RECEIVE SIGNAL WITH AN ANALOG CORRECTION SIGNAL

FIELD OF THE INVENTION

The invention relates generally to network communications. More particularly, the invention relates to methods and apparatuses for reducing electromagnetic interference in a receive signal with an analog correction signal.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10/100 BASE-T form is one of the most prevalent high speed LANs (local area network) for providing connectivity between personal computers, workstations and servers.

High-speed LAN technologies include 100 BASE-T (Fast Ethernet) and 1000 BASE-T (Gigabit Ethernet). Fast Ethernet technology has provided a smooth evolution from 10 Megabits per second (Mbps) performance of 10 BASE-T to the 100 Mbps performance of 100 BASE-T. Gigabit Ethernet provides 1 Gigabit per second (Gbps) bandwidth with essentially the simplicity of Ethernet. There is a desire to increase operating performance of Ethernet to even greater data rates.

FIG. 1 shows a block diagram of a pair of Ethernet transceivers communicating over a bi-directional transmission channel, according to the prior art. An exemplary transmission channel includes four pairs of copper wire 112, 114, 116, 118. The transceiver pair can be referred to as link partners, and includes a first Ethernet port 100 and a second Ethernet port 105. Both of the Ethernet ports 100, 105 include four transmitter $T_x$, receiver $R_x$, and I/O buffering sections corresponding to each of the pairs of copper wires 112, 114, 116, 118.

The twisted copper wires can operate as antennas that are susceptible to receive electromagnetic interference (EMI). Generally, EMI appears as a narrowband interference source to Ethernet receivers. Ethernet systems mostly rely on EMI protection that is provided by shielding, and by transmitting the information differentially to provide immunity against the common-mode characteristics of the EMI. Higher frequency EMI is also rejected by the filtering performed at the analog-front-end (AFE) of the Ethernet receiver. In the past, Ethernet systems have had sufficient operating margin such that the EMI did not cause the link to fail. However, the protection provided by current Ethernet systems is not sufficient and EMI can cause the link to fail and unable to receive data.

In Ethernet systems, after AFE processing of the receive signal, the signal is converted to a digital representation for further processing. Removing the EMI in the digital domain requires the transceiver to have an AFE and digital processing capabilities that allow it to process and convert the expected receive signal plus EMI signal into a digital representation without any additional distortion because of the presence of the EMI signal. Since the EMI signal can be large compared to the receive signal, digital mitigation of EMI requires more analog and digital resources to be able to handle and process a larger overall receive signal without introducing any new distortion or degradation. This increases the transceiver's complexity, area, power, and cost. Moreover, the addition of a large EMI signal to the receive signal can result in clipping and/or saturation, resulting in signal distortion and leading to link performance degradation.

It is desirable to have an apparatus and method for suppressing electromagnetic interference in a receive signal of Ethernet systems that addresses the above-described issues. It is additionally desirable to suppress components of transmit signals in the receive signal.

SUMMARY OF THE INVENTION

An embodiment includes a method of reducing electromagnetic interference in a receive signal. The method includes receiving a receive differential signal. An analog cancellation signal is generated. The analog cancellation signal is summed with a receive signal, thereby mitigating electromagnetic interference in the receive signal.

Another embodiment includes a transceiver. The transceiver includes a receive analog to digital converter (ADC) sampling a receive signal. Electromagnetic interference (EMI) processing circuitry generates an analog cancellation signal. The analog cancellation signal is summed with the receive signal, thereby mitigating electromagnetic interference in the receive signal.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

The described embodiments are readily understood by the following detailed description in conjunction with the accompanying drawings, wherein like reference numerals designate like structural elements, and in which.

DETAILED DESCRIPTION

Figure 1:
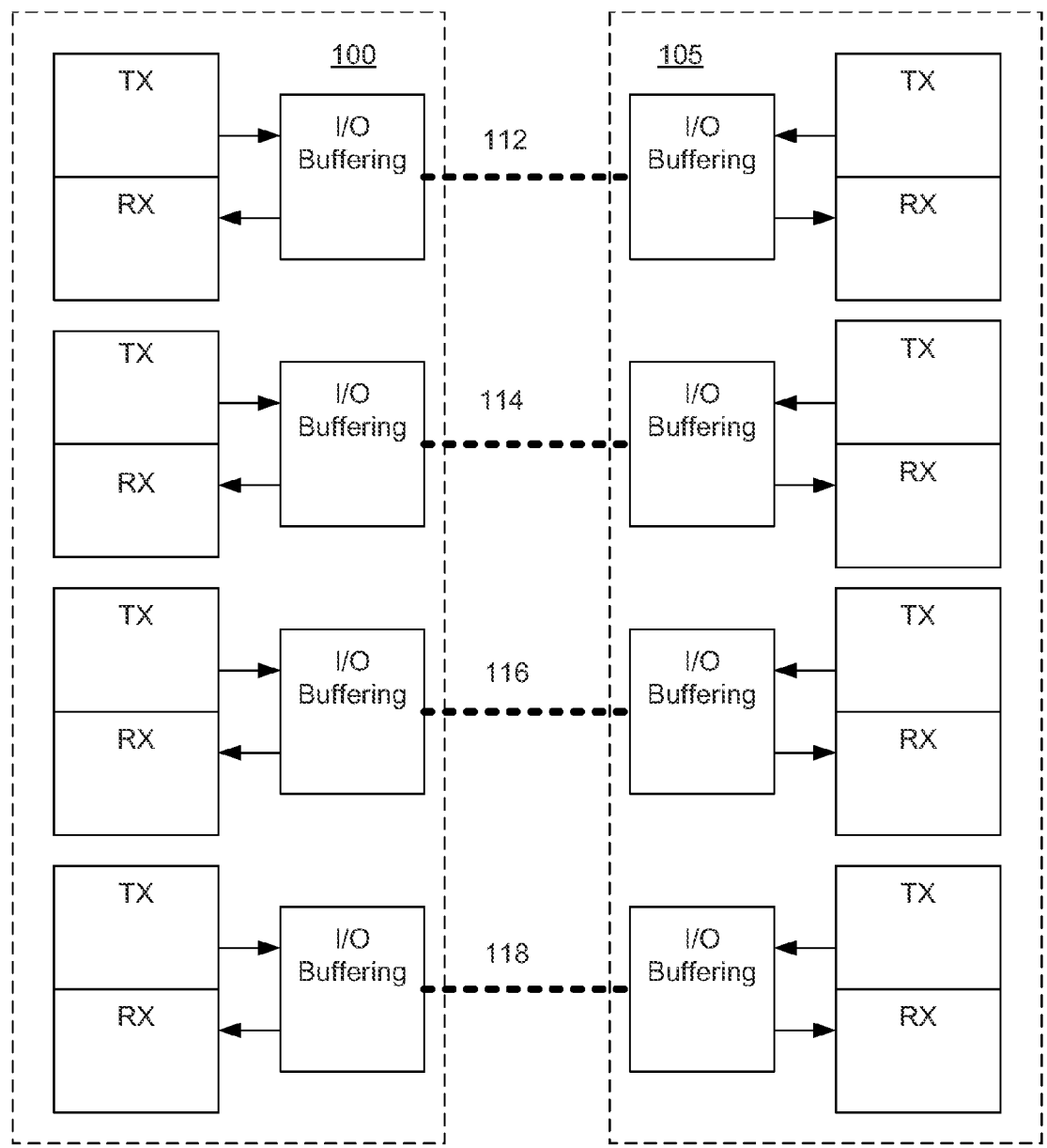
FIG. 1 shows a plurality of prior art Ethernet transceiver pairs.

As shown in the drawings for purposes of illustration, the described embodiments are embodied in apparatuses and methods for reducing electromagnetic interference in a receive signal of a transceiver. Further, the additional embodiment include apparatuses and methods for reducing transmit signal components in the receive signal. The descriptions provided are generally focused on Ethernet transceivers, but the described embodiments can be used in other configurations of transceivers as well. It is to be understood that the electromagnetic signals can take different forms. That is, the electromagnetic signals can couple into the receive signals wirelessly, through cables, through circuit boards, and/or through power supplies.

Improved EMI suppression results in a better link operation. By canceling the EMI in the analog domain the transceiver complexity and cost is reduced, resulting in a better link operation. Another advantage of analog EMI cancellation is that the EMI can be suppressed over a bandwidth that is larger than the receive ADC bandwidth, therefore reducing the EMI distortion over a higher bandwidth, which otherwise distorts the receive ADC samples.

Figure 2:
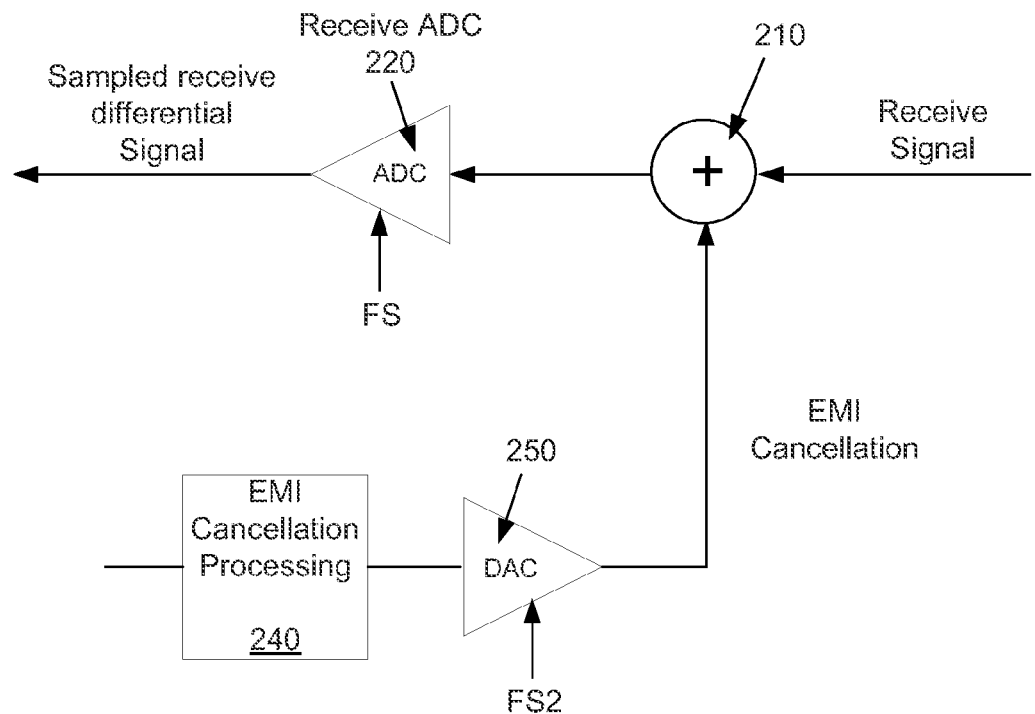
FIG. 2 shows a block diagram of an example of a transceiver that can utilize the described embodiments for reducing electromagnetic interference in a receive signal.

FIG. 2 shows a block diagram of an example of a transceiver that can utilize the described embodiments for reducing electromagnetic interference in a receive signal. Electromagnetic interference (EMI) cancellation processing circuitry 240 generates an EMI correction signal. The EMI correction signal is converted to an analog signal at a rate FS2 through a digital to analog converter (DAC) 250, before being summed (summer 210) with the receive signal. The analog EMI correction signal mitigates EMI signals in the receive signal. A receive analog to digital converter (ADC) 220 samples the receive signal at a rate FS, and generates digital samples of a receive differential signal.

The EMI cancellation processing circuitry 240 receives at least one of multiple types of signals as will be described, wherein the multiple types of signals are each based at least in part on the receive signal. The EMI cancellation signal mitigates the effects of EMI signals coupled into the receive signal.

As will be described later, an embodiment includes a training ADC sampling the receive signal at a higher rate than a sampling rate of the receive ADC, and at a lower resolution than the receive ADC, and further comprising generating the analog cancellation signal based at least in part on the training ADC samples.

Figure 3:
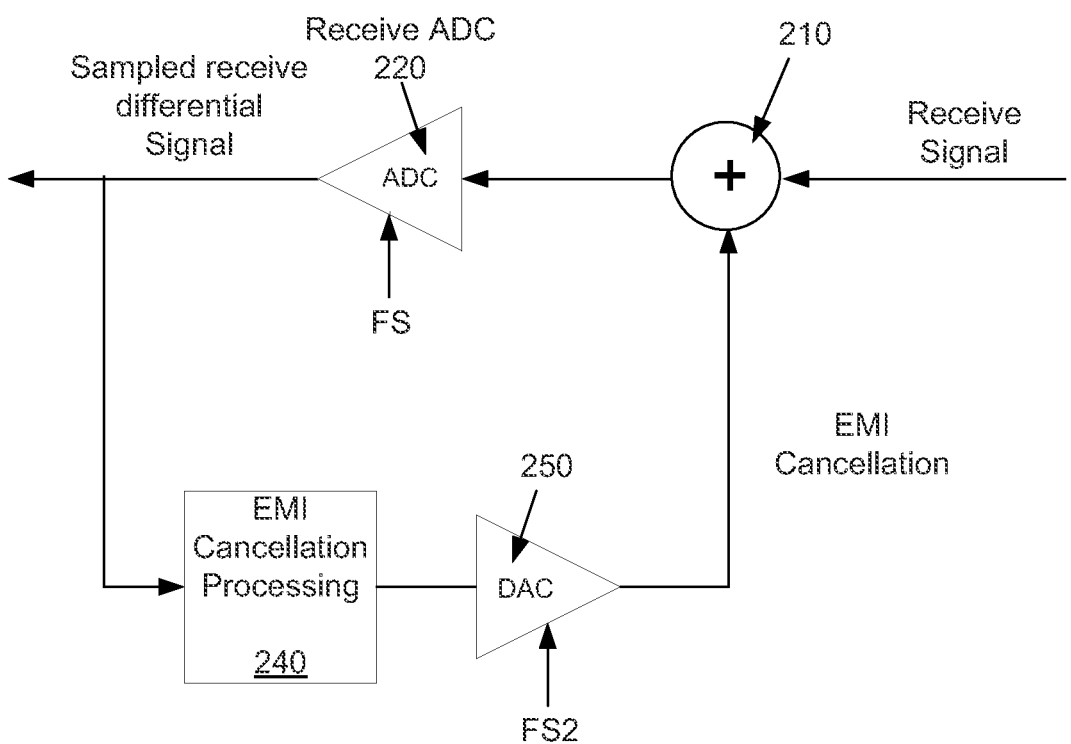
FIG. 3 shows another block diagram of an example of a transceiver that can utilize the described embodiments for reducing electromagnetic interference in a receive signal.

FIG. 3 shows another block diagram of an example of a transceiver that can utilize the described embodiments for reducing electromagnetic interference in a receive signal. This embodiment includes the EMI cancellation processing circuitry 240 and sampling of a receive differential signal, and generating the EMI cancellation by processing the samples of the receive differential signal. As will be shown and described, embodiment of the EMI cancellation processing includes generating and filtering an error of a slicer that is based on samples of the receive differential signal. For an embodiment, the sampling rates FS2 and FS are the same. For another embodiment the DAC 250 sampling rate FS2 is different than FS, and then the EMI cancellation processing could potentially include sampling rate change operations.

Figure 4:
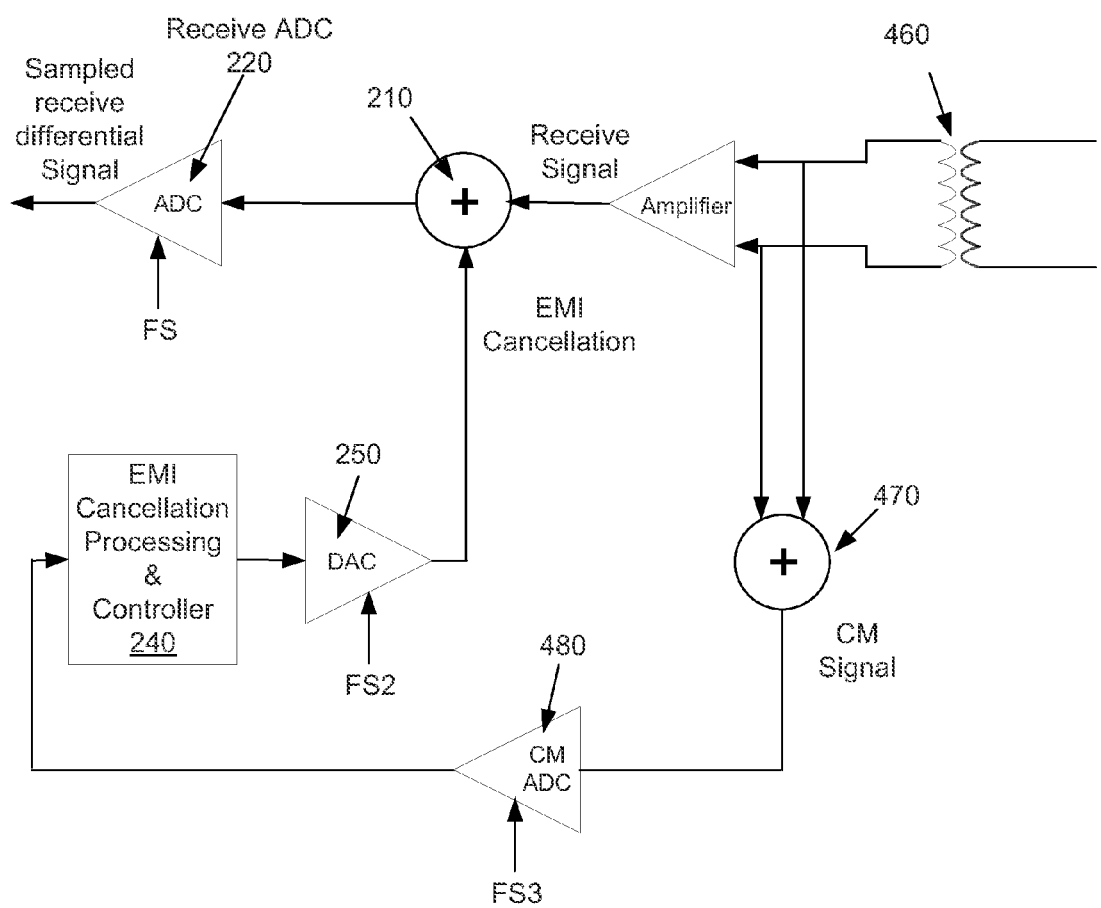
FIG. 4 shows another block diagram of an example of a transceiver that can utilize the described embodiments for reducing electromagnetic interference in a receive signal.

FIG. 4 shows another block diagram of an example of a transceiver that can utilize the described embodiments for reducing electromagnetic interference in a receive signal. This embodiment includes the EMI cancellation processing circuitry 240 receiving samples of a common mode signal extracted from a receive signal, and generating the EMI cancellation signal by processing the common mode signal samples extracted from the receive signal. For an embodiment, the sampling rates FS3 and FS2 are the same. For another embodiment the DAC 250 sampling rate FS2 is different than FS3, and then the EMI cancellation processing can include performing a sampling rate change to the samples of the common mode signal generated by the CM ADC 480.

For this embodiment, a CM signal is generated by summing signals received from a pair of conductors (such as a pair of copper wires) at a summer 470. It should be noted that various methods can be used to extract the CM signal. For example, an embodiment includes tapping a center-tap of a transformer. Other methods can include extracting the CM signal before the transformer. A CM ADC 480 generates samples of the CM signal at a rate of FS3, which are then received by the EMI cancellation processing circuitry 240.

Figure 5:
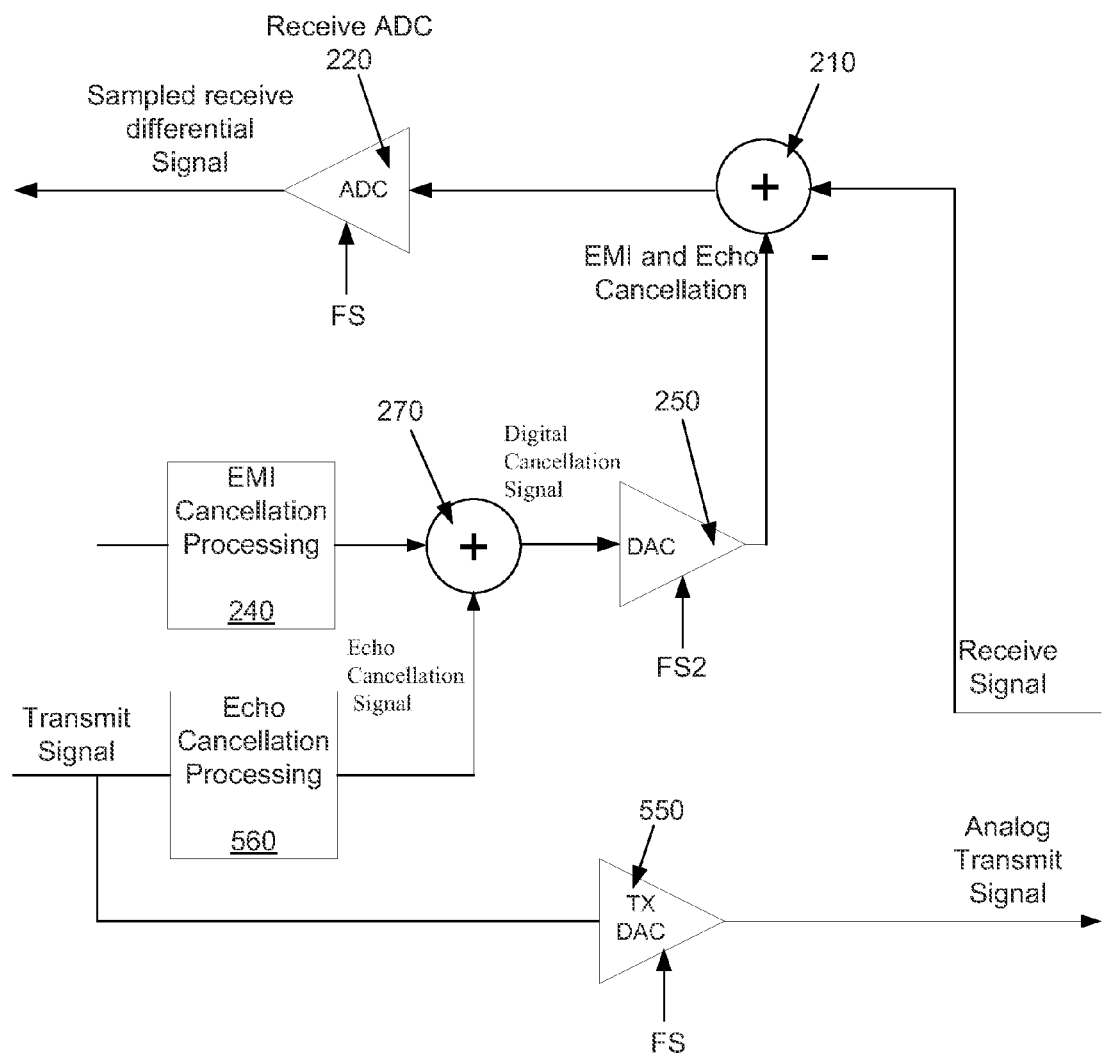
FIG. 5 shows a block diagram of an example of a transceiver that can utilize the described embodiments for reducing electromagnetic interference in a receive signal, and for reducing transmit signal components in the receive signal.

FIG. 5 shows a block diagram of an example of a transceiver that can utilize the described embodiments for reducing electromagnetic interference in a receive signal, and for reducing transmit signal components in the receive signal. This embodiment additionally includes echo cancellation processing 560 receiving a transmit signal. Full duplex transmission can result in at least a portion of the transmit signal being coupled back into the receive signal. The portion of the transmit signal that couples back is referred to as an echo signal. The echo cancellation processing 560 generates an echo cancellation signal based upon the transmit signal. Embodiments of the echo cancellation processing 560 will be described. The echo cancellation signal is summed with the EMI cancellation signal to generate a digital cancellation signal. The digital cancellation signal is converted to an analog correction signal through a correction DAC 250, and summed with the receive signal to mitigate the effects of both the electromagnetic interference (EMI) signal and the echo signal. A transmit (TX) DAC 550 generates an analog transmit signal.

For an embodiment, the sampling rates FS and FS2 are the same. For another embodiment the DAC 250 sampling rate FS2 is different than FS, and then the echo cancellation processing can potentially include performing a sampling rate change to the samples of the transmit signal. As shown in the embodiment in FIG. 5, both EMI cancellation and echo cancellation signals can be generated at the same time but other configurations are also possible. For example, based on the detected echo signal power level being below a certain level, or a short cable being deployed, or having a large link operating margin, analog echo cancellation might not be required.

If one or more of these conditions is detected, then the analog cancellation signal can be devoted entirely to canceling the EMI signal.

Alternatively, if the EMI signal power is below a threshold or the link has a lot of operating margin for EMI, no analog EMI cancellation signal needs to be generated. If one or more of these conditions is detected, then the analog cancellation signal can be devoted entirely to reducing transmit signal components in the receive signal.

Figure 6:
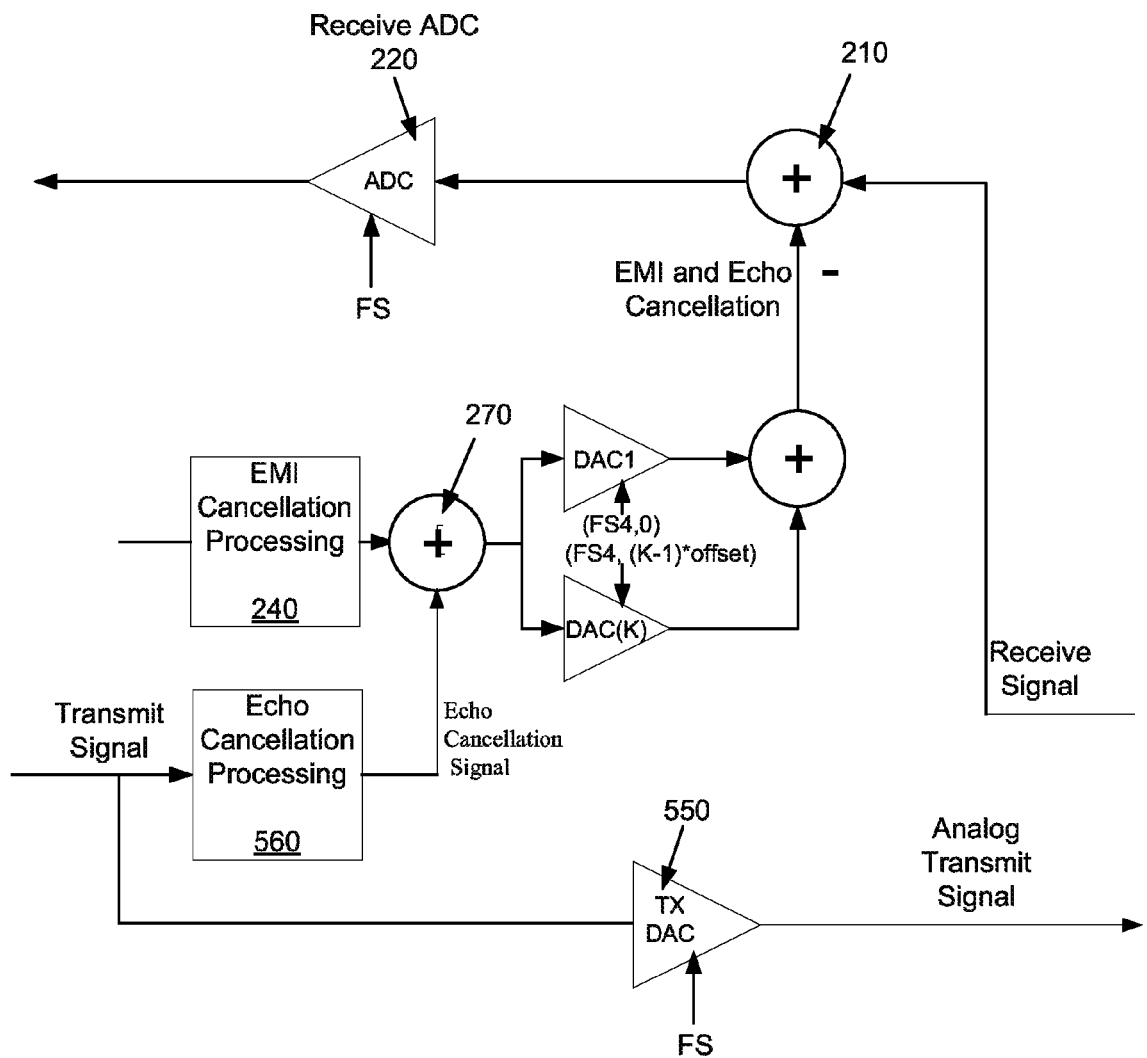
FIG. 6 shows another block diagram of an example of a transceiver that can utilize the described embodiments for reducing electromagnetic interference in a receive signal, and for reducing transmit signal components in the receive signal.

FIG. 6 shows another block diagram of an example of a transceiver that can utilize the described embodiments for reducing electromagnetic interference in a receive signal, and for reducing transmit signal components in the receive signal. This embodiment includes the cancellation DAC possibly operating at a frequency that is substantially higher than the sampling frequency FS of the receive ADC 220. That is, the cancellation DAC is implemented with K sub-DACs (DAC1-DAC(K)) in which each of the sub-DACs is clocked at a frequency of FS4, and the clock of each sub-DAC is delayed by approximately (360/k) degrees relative to the other sub-DACs. In FIG. 6, the frequency and phase offset of each sub-DAC are denoted by the tuple (frequency, phase). The result is that the effective sampling rate of the bank of sub-DACs is K*FS4. Therefore, the cancellation DAC can generate higher bandwidth cancellation signals. That is, the effective sampling rate of the cancellation DAC can be greater than, for example, the sampling frequency of the receive signal ADC 220. This is depicted in FIG. 6 with the clock being (FS4,0) for sub-DAC1, (FS4, offset) for sub-DAC2, and (FS4, (K-1)*offset) for sub-DAC(K), where the offset can be (360)/K degrees.

Figure 7:
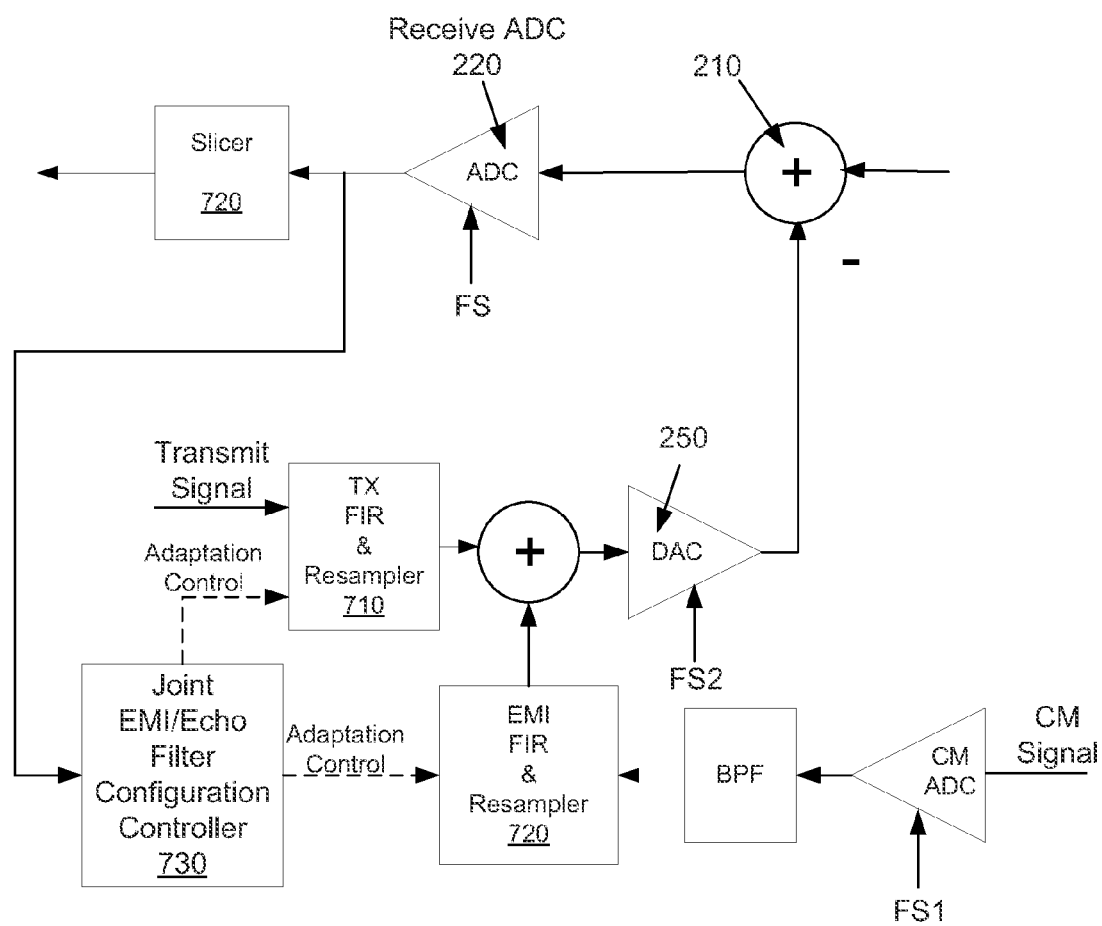
FIG. 7 shows a block diagram of an example of a transceiver that can utilize the described embodiments for reducing electromagnetic interference in a receive signal, and for reducing transmit signal components in the receive signal, using joint EMI signal and transmit signal filter processing and control.

FIG. 7 shows a block diagram of an example of a transceiver that can utilize the described embodiments for reducing electromagnetic interference in a receive signal, and for reducing transmit signal components in the receive signal using joint EMI signal filter processing and transmit signal filter processing. Here, the echo cancellation processing and the EMI cancellation processing are shown in greater detail.

As shown, the EMI cancellation signal is generated by filtering the CM signal with an EMI finite impulse response (FIR) filter 720, and the echo cancellation signal is generated by filtering the transmit signal with a TX (transmit) FIR filter 710. For an embodiment, the sampling rates FS, FS1, and FS2 are all the same. For another embodiment, the filtering blocks can potentially also include further processing that includes changing the sampling rate (re-sampling) of the processed signals if the sampling rates FS and FS1 and FS2 are different. The EMI cancellation signal and the echo cancellation signal are summed before being converted to an analog signal by the correction DAC 250.

As shown, the EMI FIR filter 720 and the TX FIR filter 710 are both configured (coefficients selected) by joint EMI/Echo processing. Here, an EMI/Echo filter configuration controller 730 selects the filter coefficients (adaptation control) based on the sampled receive differential signal.

The coefficients of the TX FIR filter 710 and the EMI FIR filter 720 are configured or adapted to reduce the transmit signal components in the receive differential signal and the EMI components in the receive differential signal, respectively. The filters 710, 720 can be configured or adapted in part based on the receive differential components so that the transmit signal components and the EMI signal are reduced in the receive differential signal at the output of the receive ADC 220.

For an embodiment, the filtering coefficients of the filters 710, 720 are selected such that the summed signal, before being converted to an analog signal, has a limited peak value.

For one possible operating mode, the filter configurations are selected such that for short cables, where the transmit signal components are below a certain level, only the EMI cancellation signal is generated and converted to an analog cancellation signal. In a different operating mode with long cables, when the EMI is not present, the filter configurations are chosen such that only the signal to reduce transmit signal components in the receive signal is generated and converted to an analog cancellation signal. For other cable lengths and channel conditions, the filter configurations are such that the cancellation signal is partitioned between EMI cancellation signal and transmit signal components cancellation signal in an efficient way to result in successful transceiver operation.

Figure 8:
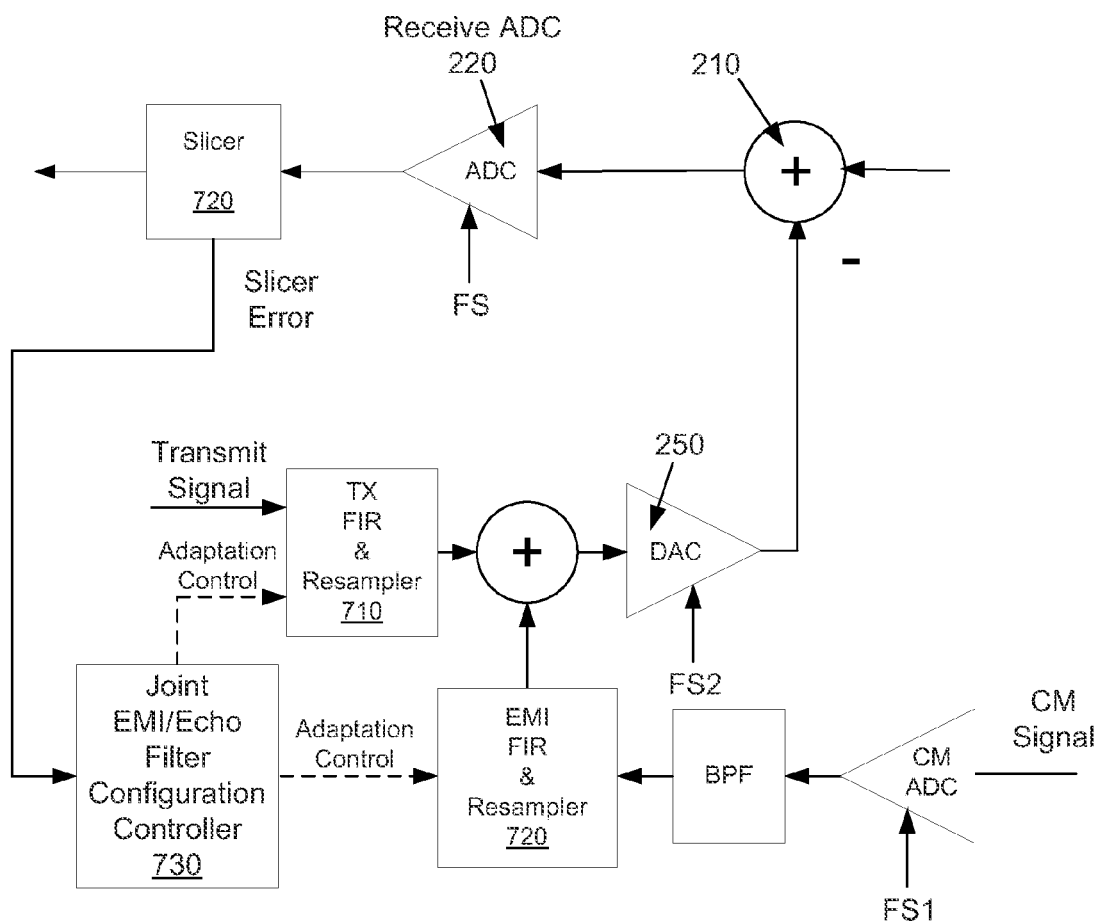
FIG. 8 shows another block diagram of an example of a transceiver that can utilize the described embodiments for reducing electromagnetic interference in a receive signal, and for reducing transmit signal components in the receive signal, using joint EMI signal and transmit signal filter processing.

FIG. 8 shows another block diagram of an example of a transceiver that can utilize the described embodiments for reducing electromagnetic interference in a receive signal, and for reducing transmit signal components in the receive signal using joint EMI signal and transmit signal filter processing. FIG. 8 is similar to FIG. 7, but includes the EMI/Echo filter configuration controller 730 selecting the filter coefficients (adaptation control) based on slicer error.

The coefficients of the TX FIR filter 710 and the EMI FIR filter 720 are configured or adapted to reduce the transmit signal components in the receive differential signal and the EMI components in the receive differential signal, respectively. The filters 710, 720 can be configured or adapted in part based on an error generated by slicer error signal.

The slicer makes decisions about the remotely transmitted information, and can include channel decoding, multi-dimensional decoding, or just single dimensional symbol-by-symbol decoding. The slicer decision is used to generate an estimate of the other signals present in the receive signal besides the transmitted information. As such, the EMI signal as well as transmit signal components present in the receive signal are contained in the slicer error. The slicer error can then be used as the error signal in an adaptive training procedure to reduce components of the EMI signal and transmit signal that are present in the receive differential signal.

Figure 9:
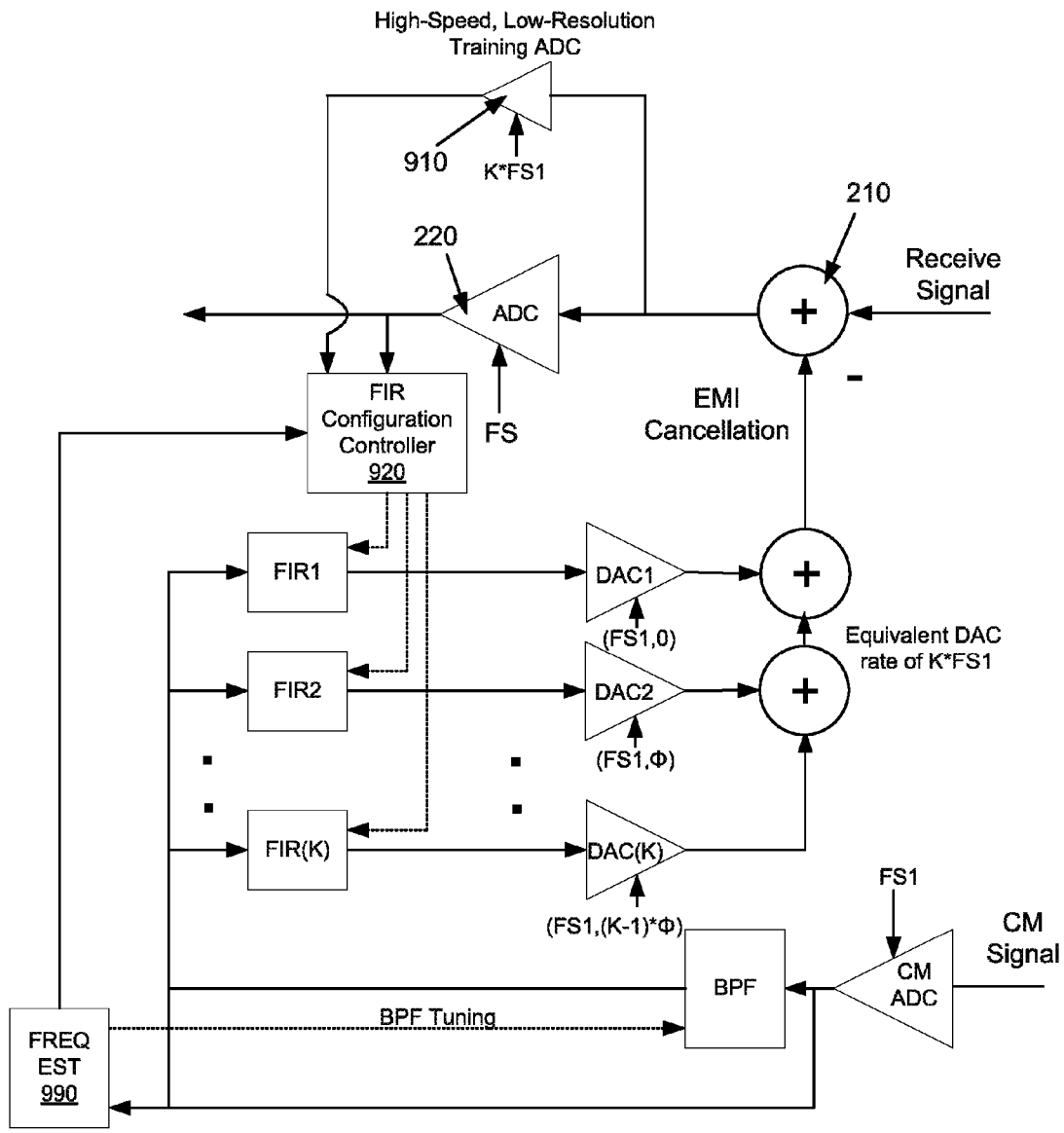
FIG. 9 shows a block diagram of an example of a transceiver that can utilize the described embodiments for reducing electromagnetic interference in a receive signal, that includes a bank of filters and a bank of electromagnetic correction signal DACs.

FIG. 9 shows a block diagram of an example of a transceiver that can utilize the described embodiments for reducing electromagnetic interference in a receive signal, that includes a bank of filters and a bank of electromagnetic correction signal DACs. FIG. 9 additionally includes a training ADC 910.

Embodiments of the training ADC 910 operate at a sampling frequency (for example, K*FS1) that is greater than the sampling frequency of the CM ADC (FS1) and the receive ADC (FS) 220. The digital samples of the training ADC 910 are received by an FIR configuration controller 920 that selects coefficients for each of the FIR filters (bank of filters FIR1 through FIR(K)).

As shown, the sampled CM receive signal is band-pass filtered, and then filtered by the bank of filters. A frequency estimator 990 estimates the EMI frequency of the EMI present in the CM signal, which can be used to tune the band-pass filter (BPF).

The FIR configuration controller selects the coefficients of each of the bank of FIR filters to generate the correct EMI cancellation signal, including providing frequency control and replica image rejection. In the example embodiment in FIG. 9, the coefficients of each of the bank of FIR filters are based on the digital samples of the training ADC 910, the digital samples of the receive ADC 220, and the estimated frequency of the electromagnetic interference (from the frequency estimator 990).

The output of each of the bank of FIR filters is received by a corresponding sub-DAC (DAC1-DAC(K)). As previously described, an embodiment includes the phase of each of the sub-DACs being different than a phase of the other sub-DACs. The effective sampling rate of the bank of sub-DACs is K*FS1. The phase (Φ) is shown in FIG. 9 to show that the clock of each of the sub-DACs is delayed relative to another of the sub-DACs.

The sampling frequencies of the ADCs and the DACs are selectable. However, an embodiment includes the sampling frequency (FS1) of the CM ADC being less than the sampling frequency (FS) of the receive ADC 220. Additionally, this embodiment includes the sampling frequency (K*FS1) of the training ADC and the effective band of sub-DACs being greater than the sampling frequency (FS) of the receive ADC 220.

This configuration allows for cancellation of EMI over a higher bandwidth while the sampled CM signal used to generate the. EMI cancellation signal could be sampled at a lower sampling rate, reducing the CM ADC's implementation complexity, cost, and area. Since the EMI is a narrowband signal, its frequency content is preserved even if the CM ADC samples result in an aliased version of the EMI because of the lower sampling rate of the common-mode ADC.

In order to generate an EMI cancellation signal over a higher bandwidth, the lower-sampling rate CM ADC signal needs to be upsampled to generate digital samples at the higher rate of the cancellation DAC or, equivalently, generate digital samples to drive every one of the lower-rate cancellation sub-DACs (DAC1, DAC2, . . . , DAC(K)). Such a sampling rate conversion could be achieved using polyphase filtering, which is equivalent to sending the lower-sampling rate CM ADC signal to a parallel bank of filters each driving a DAC operating at the sampling rate of the CM ADC. For the polyphase filters to generate the correct digital samples to achieve cancellation over a higher bandwidth, the true analog EMI frequency needs to be known.

The lower-resolution high-speed training ADC 910 acts as a discriminator in that it allows the FIR Configuration Controller 920 to determine the true location of the analog EMI frequency from a set of K possible locations. The FIR configuration controller 920 uses the information about the true analog EMI frequency to design the FIR filters to synthesize the coefficients that will zero out all the image frequencies generated in the sampling rate conversion process, as well as correctly shape the generated cancellation signal to cancel the analog EMI signal. In order to correctly tune the polyphase filters, the aliased EMI frequency also could be used, and so the FREQ EST 990 provides the aliased EMI frequency information to the FIR configuration controller.

In addition to suppressing the EMI image frequencies, the FIR filters are adaptively trained to cancel the EMI frequency. The adaptation can potentially use the CM ADC signal and the differential receive ADC signal to generate the FIR filters' input and error to drive an adaptive mechanism to correctly configure coefficients to cancel the EMI.

Figure 10:
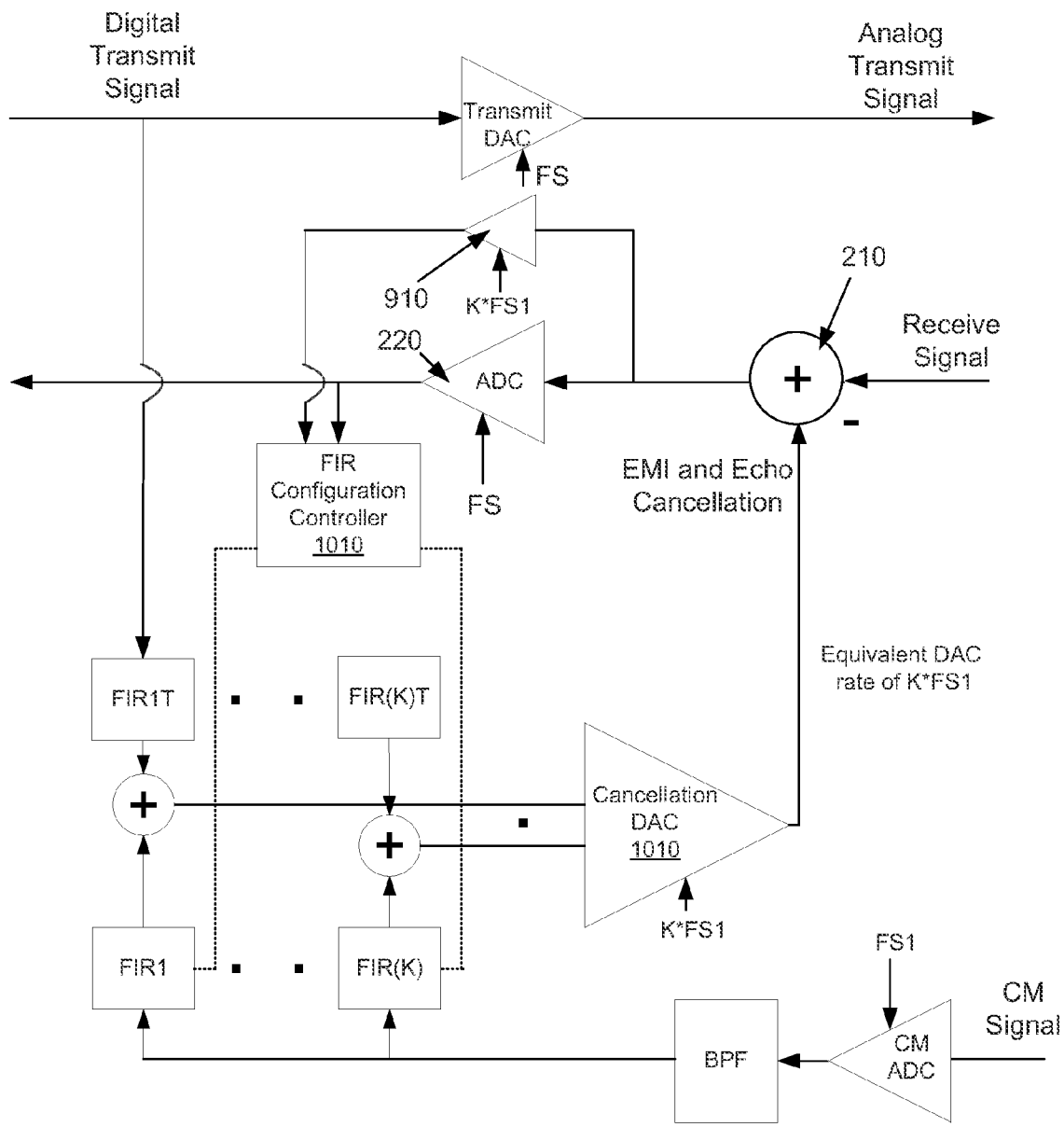
FIG. 10 shows a block diagram of an example of a transceiver that can utilize the described embodiments for reducing electromagnetic interference in a receive signal, that includes a bank of filters and a bank of electromagnetic correction signal DACs, and a bank of transmit signal filters.

FIG. 10 shows a block diagram of an example of a transceiver that can utilize the described embodiments for reducing electromagnetic interference and transmit signal components in a receive signal that includes a bank of filters and a bank of electromagnetic correction signal DACs, and a bank of transmit signal filters. This embodiment is similar to the embodiment of FIG. 9, but further includes the echo cancellation processing. As shown, a bank of echo FIR filters (FIR1T-FIR(K)T) receive the digital transmit signal and generate echo cancellation signals. The FIR configuration controller 1010 additionally selects filter coefficients for each of the bank of echo FIR filters, along with selection of the filter coefficients for each of the bank of EMI filters (FIR1-FIR (K)).

The echo cancellation signals generated by each of the bank of echo FIR filters are summed with a corresponding EMI cancellation signal of one of the bank of EMI filters. Each of the summed outputs is connected to a corresponding one of a bank of DACs within the cancellation DAC 1010. The cancellation DAC 1010 generates an analog correction signal that mitigates the effects of EMI in the receive signal, and mitigates the effects of transmit signal components in the receive signal.

The FIR configuration controller 1010 jointly selects the filter coefficients based on the samples of the training ADC 910 and the receive ADC 220 and the CM ADC. In addition to all the applicable descriptions for FIG. 9, FIG. 10 also allows for cancellation of transmit signal components over a larger bandwidth than the receive ADC 220 bandwidth, reducing the distortion that can be generated by not suppressing the transmit signal components over the entire bandwidth where the transmit signal components in the receive signal have significant energy. In one possible operation mode, the training ADC provides information that can be used to adapt the transmit signal FIR filters and the EMI FIR filters to cancel EMI and transmit signal components at a sampling rate of K*FS1.

Figure 11:
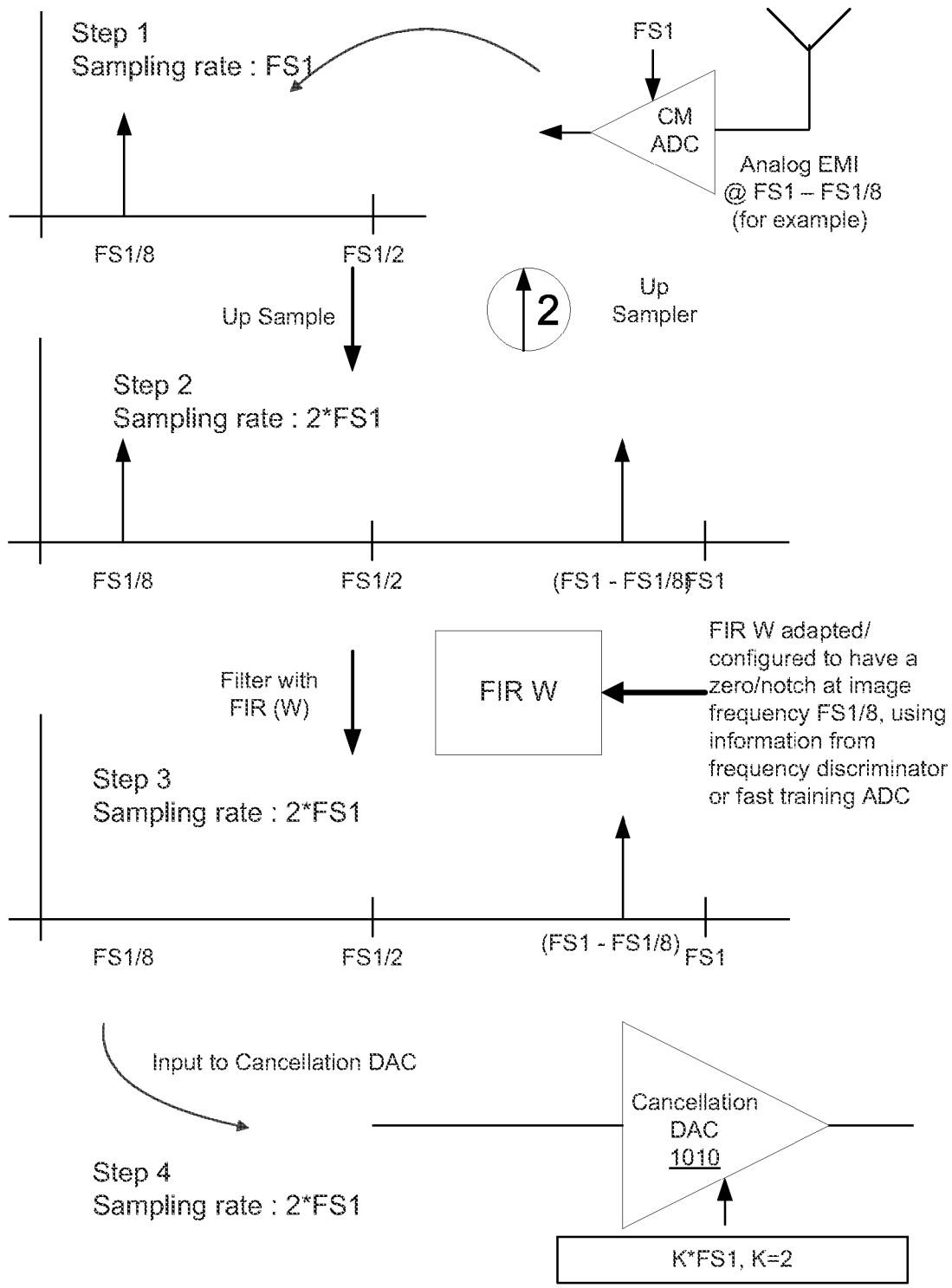
FIG. 11 shows a depiction of a frequency spectrum during an example of a process of cancelling spectral images of upsampled signals of a low sampling-frequency common mode signal, wherein the sampled common mode signal is used for generation of the electromagnetic correction signal.

FIG. 11 shows a depiction of a frequency spectrum during an example of a process of cancelling image replicas of a low-frequency sampled common mode signal, wherein the lower-frequency sampled common mode signal is used for generation of the higher-sampling rate electromagnetic correction signal. As shown in a step 1, an analog EMI signal at a frequency of FS1−(FS1/8) is coupled into the CM signal, and in the receive differential signal as well. The sampled CM signal (sampled at FS1) has a frequency component at FS1/8 (due to aliasing). The sampled CM signal is up-sampled (at step 2) yielding a signal having the EMI frequency component at FS1/8 and the EMI image frequency component at FS1-FS1/8. If it is determined that the EMI is located above the sampling rate FS1/2, then it can be assumed that the EMI frequency component at FS1/8 is not an EMI component, but rather, a replica image introduced in the upsampling process. Therefore, an FIR filter (W) can be configured to filter out or notch the FS1/8 image frequency component (step 3), leaving the FS1-FS1/8 component which is then input (step 4) to the cancellation DAC 1010 for generating the analog cancellation signal.

As the image frequency is removed, the FIR filter W is adapted to have its coefficients synthesize the correct digital input to the cancellation DAC to generate an analog signal to cancel the analog EMI afflicting the receiver. The filter adaptation could be carried out jointly with the notching of the image frequencies to generate an EMI correction signal with the correct analog frequency.

Similarly to FIGS. 9 and 10, the high-speed cancellation DAC could be implemented as a bank of lower-speed DACs. Such an implementation allows for an efficient implementation of the polyphase FIR filters used to upsample the lower-sampling rate CM ADC signal to the higher-sampling rate of the cancellation DAC. Each lower-sampling frequency DAC corresponds to one of the outputs of one of the FIR filters in FIGS. 9 and 10.

Figure 12:
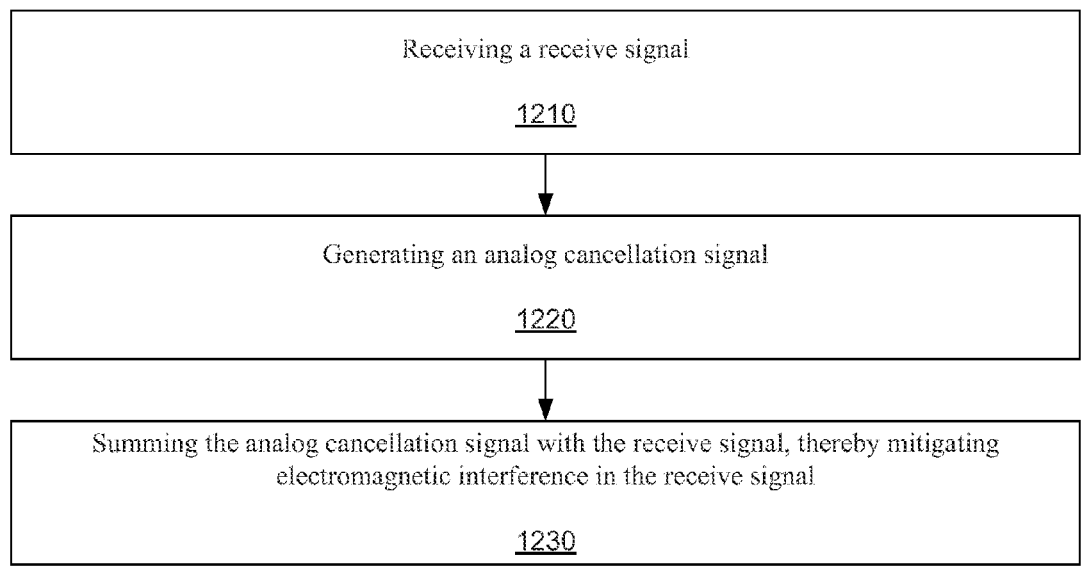
FIG. 12 is a flow chart that includes an example of steps of a method of reducing electromagnetic interference in a receive signal.

FIG. 12 is a flow chart that includes an example of steps of a method of reducing electromagnetic interference in a receive signal. A first step 1210 includes receiving a receive differential signal. A second step 1220 includes generating an analog cancellation signal. A third step 1230 includes summing the analog cancellation signal with a receive signal, thereby mitigating electromagnetic interference in the receive signal.

One embodiment includes generating the analog cancellation signal based at least in part upon a common mode signal extracted from the receive signal. Another embodiment includes generating the analog cancellation signal based at least in part upon a differential mode signal extracted from the receive signal.

An embodiment includes an EMI (electromagnetic interference) Digital to Analog Converter (DAC) receiving a digital electromagnetic interference cancellation signal and generating the analog cancellation signal. A specific embodiment includes a sampling rate of the EMI DAC being greater than a sampling rate of an analog to digital converter (ADC) that receives and samples the receive differential signal, wherein remotely transmitted data is extracted from the receive differential signal. For a more specific embodiment, the EMI DAC includes a plurality of sub-DACs, and wherein a phase of a clock of one of the plurality of sub-DACs is different than a phase of a clock of one other of the plurality of sub-DACs.

An embodiment includes the transceiver simultaneously transmitting a transmit signal and receiving the receive differential signal. An echo cancellation signal is generated based on the transmit signal, and the analog cancellation signal is generated at least in part on the electromagnetic interference cancellation signal and the echo cancellation signal. For an embodiment, summing the analog cancellation signal with the receive signal mitigates electromagnetic interference in the receive signal, and mitigates transmit signal components in the receive signal.

An embodiment includes a cancellation Digital to Analog Converter (DAC) receiving a digital cancellation signal and generating the analog cancellation signal. For an embodiment, a sampling rate of the cancellation DAC is greater than a sampling rate of an analog to digital converter (ADC) that receives and samples the receive differential signal, wherein remotely transmitted data is extracted from the receive differential signal. A specific embodiment of the cancellation DAC includes a plurality of sub-DACs, wherein a phase of a clock of one of the plurality of sub-DACs is different than a phase of a clock of one other of the plurality of sub-DACs.

An embodiment includes generating the analog cancellation signal base at least in part upon a common mode signal extracted from a receive signal. Another embodiment includes generating the analog cancellation signal base at least in part upon a differential mode signal extracted from the receive signal. Another embodiment includes generating the analog cancellation signal base at least in part upon a combination of the common mode signal extracted from the receive signal, and a differential mode signal extracted from the receive differential signal.

For an embodiment, the generation of the analog cancellation signal is influenced by the transmit signal when the amount of transmit signal in the receive signal is determined to be above a threshold. Different methods can be used to determine that the transmit signal is above the threshold. The echo signal can be detected directly, or a length of a cable between the transceiver and a partner transceiver can be determined, and the level of the transmit signal is assumed.

For an embodiment, generation of the analog cancellation signal includes jointly processing at least a portion of the transmit signal, and at least a portion of the receive signal. For an embodiment, generation of the digital cancellation signal includes jointly processing at least a portion of the transmit signal, and at least a portion of the receive signal. For an embodiment, the joint processing includes configuring filtering of the transmit signal and filtering of an extracted common mode signal of the receive signal based on the receive signal. For another embodiment, the joint processing includes configuring filtering of the transmit signal and filtering of an extracted common mode signal in a receive signal based on a slicer error of a slicer that decodes the receive differential signal. For an embodiment, the joint processing and filter configurations ensure that an input to the cancellation DAC is maintained below a threshold.

For an embodiment, generation of the digital cancellation signal further includes sampling an extracted common mode signal of the receive signal at a sampling rate that is less than a sampling rate of the cancellation DAC. For an embodiment, generation of the digital electromagnetic interference cancellation signal further includes sampling an extracted common mode signal from a receive signal at a sampling rate that is greater than a sampling frequency of the receive ADC, and the sampling of the extracted common mode signal is at a lower resolution than the sampling of the receive signal.

For an embodiment, a sampling rate of the cancellation DAC is greater than a sampling rate of a transmit signal DAC, and the cancellation DAC has lower resolution than the transmit signal DAC. For an embodiment, receive processing of the receive signal digitally mitigates distortion of the receive signal due to the resolution of the cancellation DAC.

The distortion introduces by using a lower resolution cancellation DAC is corrected by generating the correction signals at the receiver. As the transceiver can calculate the signals that are not generated by the DAC because of its lower resolution, and knowing the response of the cancellation DAC as its samples reach the receive ADC, it is possible to synthesize the correction signals at the received such that it appears as if the cancellation DAC had a higher resolution, and therefore did not introduce significant distortion because of its limited resolution.

An embodiment includes sampling an extracted common mode signal of the receive signal at a first sampling rate (FS1), filtering the sampled extracted common mode signal with a bank of N filters, wherein the cancellation DAC receives outputs of the bank of N filters and generates the analog cancellation signal at a sampling rate of (N*FS1). For a more specific embodiment, the cancellation DAC includes N sub cancellation DACs, and each of sub cancellation DACs receives an output from a corresponding one of the bank of N filters, wherein a sampling rate of each of the sub cancellation DACs is FS1 phase shifted relative to at least one other of the sub cancellation DACs.

An embodiment includes a training ADC sampling the receive signal at a higher rate than a sampling rate of the receive ADC, and at a lower resolution than the receive ADC. A filter bank controller influences the coefficients of each of the bank of N filters based on the receive ADC samples, the training ADC samples, and the common-mode signal samples. For a specific embodiment, the samples of the training ADC are used to determine a frequency of the electromagnetic interference from a finite set of possible aliased frequencies, allowing the digital cancellation signal to mitigate the electromagnetic interference when a sampling rate of a common mode Analog to Digital Converter (ADC) is less than twice the frequency of the electromagnetic interference, wherein the digital cancellation signal is based at least in part upon samples of the common mode ADC.

For another embodiment, the filter bank controller receives at least a portion of the transmit signal. The filter bank controller additionally selects coefficients of each of a second bank of N filters based on the receive ADC samples and the training ADC samples.

A Network of Devices

Figure 13:
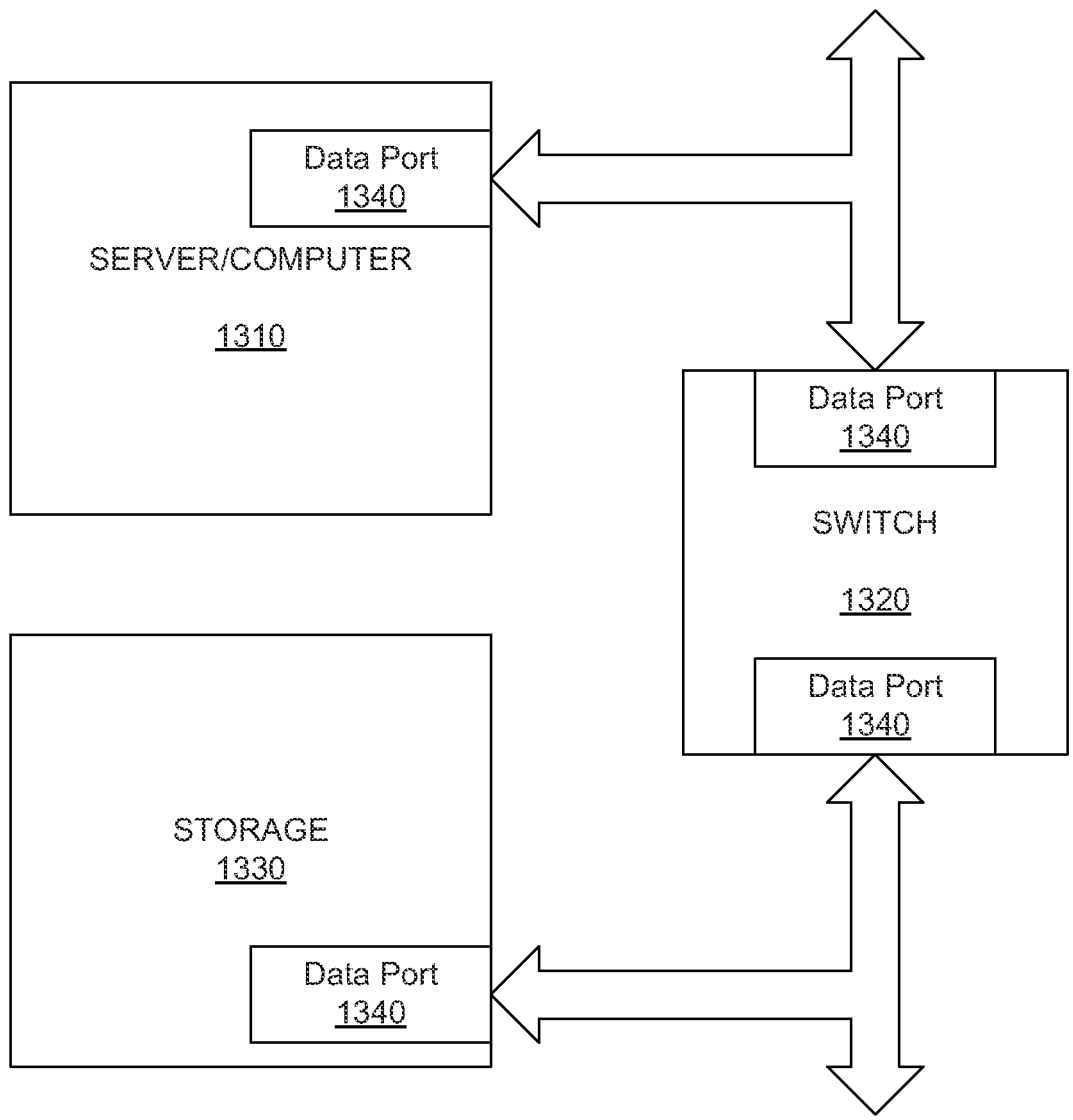
FIG. 13 shows devices connected to an Ethernet network that can include embodiments of reducing electromagnetic interference in a receive signal.

FIG. 13 shows devices connected to an Ethernet network that can include embodiments of reducing electromagnetic interference in a receive signal of a transceiver. The network includes a server/computer 1310, a switch 1320 and storage 1330 that can all benefit from reducing electromagnetic interference in a receive signal of a transceiver 1340. The server/computer 1310 can be connected to the switch 1320 through an Ethernet twisted pair LAN connection. The switch 1320 can additionally be connected to the storage 1330 through an Ethernet twisted pair LAN connection. The transceivers 1340 within the server/computer 1310, the switch 1320, and the storage 1330 can provide reduction of electromagnetic interference.

Although specific embodiments of the invention have been described and illustrated, the invention is not to be limited to the specific forms or arrangements of parts so described and illustrated. The invention is limited only by the appended claims.

What is claimed:

1. A method of mitigating narrowband electromagnetic interference (EMI) on signals transferred along a wired signaling link, the method comprising:
    receiving a receive signal from the wired signaling link that is within a predetermined band of frequencies, the receive signal including a narrowband EMI component, the narrowband EMI component comprising a signal within a band of frequencies less than the predetermined band of frequencies;
    estimating the narrowband EMI component in the receive signal;
    generating an analog cancellation signal based on the estimating; and
    summing the analog cancellation signal with the receive signal to cancel at least a portion of the narrowband EMI component.

2. The method of claim 1, further comprising generating the analog cancellation signal based at least in part upon a common mode signal extracted from the receive signal.

3. The method of claim 1, further comprising generating the analog cancellation signal based at least in part upon a slicer error signal.

4. The method of claim 1, wherein generating the analog cancellation signal comprises an EMI (electromagnetic interference) Digital to Analog Converter (DAC) receiving a digital electromagnetic interference cancellation signal and generating the analog cancellation signal.

5. The method of claim 4, wherein a sampling rate of the EMI DAC is greater than a sampling rate of a receive analog to digital converter (ADC) that samples the receive signal.

6. The method of claim 5, wherein the EMI DAC comprises a plurality of subDACs, and wherein a phase of a clock of one of the plurality of sub-DACs is different than a phase of a clock of one other of the plurality of sub-DACs.

7. The method of claim 5, further comprising a training ADC sampling the receive signal to generate training ADC samples at a greater rate than a sampling rate of the receive ADC, and at a lower resolution than the receive ADC, and further comprising generating the analog cancellation signal based at least in part on the training ADC samples.

8. The method of claim 1, further comprising the transceiver simultaneously transmitting a transmit signal and receiving the receive signal along the wired signaling link, generating an echo cancellation signal based on the transmit signal, and further comprising generating the analog cancellation signal based at least in part on the echo cancellation signal.

9. The method of claim 8, wherein summing the analog cancellation signal with the receive signal mitigates electromagnetic interference in the receive signal, and mitigates transmit signal components in the receive signal.

10. The method of claim 9, wherein generating the analog cancellation signal comprises a cancellation Digital to Analog Converter (DAC) receiving a digital cancellation signal and generating the analog cancellation signal.

11. The method of claim 10, wherein a sampling rate of the cancellation DAC is greater than a sampling rate of a receive analog to digital converter (ADC) that samples the receive signal.

12. The method of claim 11, wherein the cancellation DAC comprises a plurality of sub-DACs, wherein a phase of a clock of one of the plurality of sub-DACs is different than a phase of a clock of one other of the plurality of sub-DACs.

13. The method of claim 8, further comprising generating the analog cancellation signal based at least in part upon a common mode signal extracted from the receive signal.

14. The method of claim 8, further comprising generating the analog cancelation signal based at least in part upon the receive signal.

15. The method of claim 13, further comprising generating the analog cancellation signal based at least in part upon a combination of the common mode signal extracted from the receive signal, and the receive signal.

16. The method of claim 8, wherein the generation of the analog cancellation signal is influenced by the transmit signal when an amount of the transmit signal in the receive signal is determined to be above a threshold.

17. The method of claim 8, wherein generation of the analog cancellation signal comprises jointly processing at least a portion of the transmit signal, and at least a portion of the receive signal.

18. The method of claim 10, wherein generation of the digital cancellation signal comprises jointly processing at least a portion of the transmit signal, and at least a portion of the receive signal.

19. The method of claim 18, wherein the jointly processing comprises configuring filtering of the transmit signal and filtering of a common mode signal extracted from the receive signal.

20. The method of claim 18, wherein the jointly processing comprises configuring filtering of the transmit signal and filtering of a slicer error of a slicer that decodes a receive differential signal.

21. The method of claim 18, wherein the jointly processing ensures that an input to the cancellation DAC is maintained below a threshold.

22. The method of claim 18, wherein generation of the digital cancellation signal further comprises sampling a common mode signal extracted from the receive signal at a sampling rate that is less than a sampling frequency of the cancellation DAC.

23. The method of claim 18, wherein generation of the digital cancellation signal further comprises sampling a common mode signal extracted from the receive signal at a sampling rate that is less than that of a sampling frequency of a receive analog to digital converter (ADC), and with a lower resolution than a resolution of the sampling frequency of the receive ADC.

24. The method of claim 10, wherein a sampling rate of the cancellation DAC is greater than a sampling rate of a transmit signal DAC, and the cancellation DAC has lower resolution than a resolution of the transmit signal DAC.

25. The method of claim 24, wherein transceiver processing of the receive signal digitally mitigates distortion of the receive signal due to the lower resolution of the cancellation DAC.

26. The method of claim 10, further comprising sampling a common mode signal extracted from the receive signal at a first sampling rate (FS1), filtering the sampled extracted common mode signal with a bank of N filters, the cancellation DAC receiving outputs of the bank of N filters and generating the analog cancellation signal at a sampling rate of (N*FS1).

27. The method of claim 26, wherein the cancellation DAC comprises N sub cancellation DACs, and each of the sub cancellation DACs receives an output from a corresponding one of the bank of N filters, wherein a sampling rate of each of the sub cancellation DACs is FS1 phase shifted relative to at least one other of the sub cancellation DACs.

28. The method of claim 27, further comprising:
a training ADC sampling the receive signal at a greater rate than a sampling rate of the receive ADC, and at a lower resolution than a resolution of the receive ADC;
a filter bank controller influencing coefficients of each of the bank of N filters based on the receive ADC samples, the training ADC samples, and the common-mode signal samples.

29. The method of claim 28, wherein the samples of the training ADC are used to determine a frequency of the electromagnetic interference from a finite set of possible aliased frequencies, allowing the digital cancellation signal to mitigate the electromagnetic interference when a sampling rate of a common mode Analog to Digital Converter (ADC) is less than twice the frequency of the electromagnetic interference, wherein the digital cancellation signal is based at least in part upon samples of the common mode ADC.

30. The method of claim 28, further comprising:
the filter bank controller receiving at least a portion of the transmit signal;
the filter bank controller additionally selecting coefficients of each of a second bank of N filters based on the receive ADC samples and the training ADC samples.

31. An electromagnetic interference (EMI) cancellation transceiver, comprising:
a receive analog to digital converter (ADC) sampling a receive signal from a wired signaling link, the receive signal being within a predetermined band of frequencies and including a narrowband EMI component, the narrowband EMI component comprising a signal within a band of frequencies less than the predetermined band of frequencies;
EMI processing circuitry generating a narrowband analog cancellation signal; and
summing the analog cancellation signal with the receive signal, thereby cancelling at least a portion of the narrowband EMI component in the receive signal.

32. The transceiver of claim 31, further comprising an EMI (electromagnetic interference) Digital to Analog Converter (DAC) generating the analog cancellation signal from a digital electromagnetic interference signal.

33. The transceiver of claim 32, wherein a sampling rate of the EMI DAC is greater than a sampling rate of the ADC.

34. The transceiver of claim 33, wherein the EMI DAC comprises a plurality of sub-DACs, and wherein a phase of a clock of one of the plurality of sub-DACs is different than a phase of a clock of one other of the plurality of sub-DACs.

35. The transceiver of claim 31, further comprising the transceiver simultaneously transmitting a transmit signal and receiving the receive differential signal, generating an echo cancellation signal based on the transmit signal, and further comprising generating the analog cancellation signal based at least in part on the echo cancellation signal.

36. The transceiver of claim 35, further comprising:
a summer summing the analog cancellation signal with a receive signal to mitigate electromagnetic interference in the receive signal, and mitigate transmit signal components in the receive signal.

37. The transceiver of claim 36, wherein generating the analog cancellation signal comprises a cancellation Digital to Analog Converter (DAC) receiving a digital cancellation signal and generating the analog cancellation signal.

38. The transceiver of claim 37, wherein a sampling rate of the cancellation DAC is greater than a sampling rate of a transmit signal DAC, and the cancellation DAC has lower resolution than the transmit signal DAC.

39. The transceiver of claim 38, wherein transceiver processing of the receive signal digitally mitigates distortion of the receive signal due to the lower resolution of the cancellation DAC.

40. The transceiver of claim 37, further comprising sampling an extracted common mode signal of the receive signal at a first sampling rate (FS1), filtering the sampled extracted common mode signal with a bank of N filters, the cancellation DAC receiving outputs of the bank of N filters and generating the analog cancellation signal at a sampling rate of (N*FS1).

41. The transceiver of claim 40, wherein the cancellation DAC comprises N sub cancellation DACs, and each of the sub cancellation DACs receives an output from a corresponding one of the bank of N filters, wherein a sampling rate of each of the sub cancellation DACs is FS1 phase shifted relative to at least one other of the sub cancellation DACs.

42. The transceiver of claim 41, further comprising:
a training ADC sampling the receive signal at a greater rate than a sampling rate of a receive ADC, and at a lower resolution than the receive ADC;
a filter bank controller influencing the coefficients of each of the bank of N filters based on the sampled receive signal and the training ADC samples and the common-mode signal.

* * * * *